United States Patent
Dai

(10) Patent No.: US 10,705,627 B2
(45) Date of Patent: Jul. 7, 2020

(54) METHOD AND ACTIVE STYLUS FOR GENERATING SIGNAL, METHOD AND TOUCH SCREEN FOR ANALYZING SIGNAL

(71) Applicant: SHENZHEN GOODIX TECHNOLOGY CO., LTD., Shenzhen, Guangdong (CN)

(72) Inventor: Shili Dai, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 186 days.

(21) Appl. No.: 15/811,977

(22) Filed: Nov. 14, 2017

(65) Prior Publication Data

US 2018/0081457 A1  Mar. 22, 2018

Related U.S. Application Data

(63) Continuation of application No. PCT/CN2016/099156, filed on Sep. 17, 2016.

(51) Int. Cl.
*G06F 3/038* (2013.01)
*G06F 3/0354* (2013.01)
(Continued)

(52) U.S. Cl.
CPC ........ *G06F 3/03545* (2013.01); *G06F 3/0383* (2013.01); *G06F 3/044* (2013.01); *G06F 3/0416* (2013.01)

(58) Field of Classification Search
CPC .. G06F 3/03545; G06F 3/0383; G06F 3/0416; G06F 3/044
See application file for complete search history.

(56) References Cited

U.S. PATENT DOCUMENTS

| 7,653,867 B2 * | 1/2010 | Stankovic | H03M 7/30 714/785 |
| 2010/0051356 A1 * | 3/2010 | Stern | G06F 3/03545 178/19.04 |
| 2014/0104186 A1 * | 4/2014 | Bakken | G06F 3/044 345/173 |

FOREIGN PATENT DOCUMENTS

| CN | 102123117 A | 7/2011 |
| CN | 1036777339 A | 3/2014 |

(Continued)

OTHER PUBLICATIONS

Extended European Search Report for European Patent Application No. 16901901 dated Apr. 3, 2018.

*Primary Examiner* — Ram A Mistry
(74) *Attorney, Agent, or Firm* — Heslin Rothenberg Farley & Mesiti P.C.

(57) ABSTRACT

A method for generating a signal includes: encoding, by an active stylus, transmission information into n-bit q-ary codes; performing, by the active stylus, frequency modulation on the n-bit q-ary codes, respectively, to generate a plurality of encoded frequency-modulated signals; and combining, by the active stylus, a preset fixed-frequency signal for detecting a stylus tip position with the plurality of encoded frequency-modulated signals to form an encoded signal. A method for analyzing a signal, an active stylus, and a touchscreen are also provided. The method for generating a signal, the method for analyzing a signal, the active stylus, and the touchscreen transmit more coding information within a relatively short time, thereby solving a problem of low efficiency of information transmission between an active stylus and a touch screen.

14 Claims, 6 Drawing Sheets

(51) Int. Cl.
*G06F 3/041* (2006.01)
*G06F 3/044* (2006.01)

(56) References Cited

FOREIGN PATENT DOCUMENTS

| | | |
|---|---|---|
| CN | 105468170 A | 4/2016 |
| CN | 105607765 A | 5/2016 |
| WO | 2012139341 A1 | 10/2012 |
| WO | 2016004003 A1 | 1/2016 |

* cited by examiner

METHOD AND ACTIVE STYLUS FOR GENERATING SIGNAL, METHOD AND TOUCH SCREEN FOR ANALYZING SIGNAL

CROSS-REFERENCE TO RELATED APPLICATION

This application is a continuation of International Patent Application No. PCT/CN2016/099156, with an international filing date of Sep. 17, 2016, which is hereby incorporated by reference herein, in its entirety.

TECHNICAL FIELD

The present disclosure relates to electronic information technologies, and particularly to a method for generating a signal, a method for analyzing a signal, an active stylus, and a touch screen.

BACKGROUND

An active stylus is an electronic product that transmits a signal by using a stylus tip, while a screen side receives the signal and demodulates the signal to obtain stylus tip position information and other information. In addition to a stylus tip position function, an existing active stylus generally has other functions such as a pressure detection function and a key function etc. For stylus tip positioning, an active stylus only needs to transmit a signal having a fixed frequency. A screen side receives the signal by using sensing channels that are arranged in a certain shape, and determines the position of a stylus tip on the screen according to signal strengths detected by the sensing channels. As a pressure sensor, a button or another sensor is all disposed on an active stylus, pressure information, button information or other information on the active stylus is necessary to be transmitted through a stylus tip to a screen in a particular way, and the screen demodulates to obtain the information.

Currently, there are two main methods for transmitting pressure information, button information or other information by commercially available active stylus products. In one method, a binary coding is used. As shown in FIG. 1, a binary code is used in encoding. A frequency-modulated signal of a coordinate position is combined with a pressure signal or a function key pressing signal to form an encoded signal. Each bit of the encoding is amplitude modulated. Information is transmitted by combination coding of 1 and 0. Each bit is determined according to the demodulated amplitude of a signal. When the amplitude exceeds a threshold value, a bit is determined as 1. When the amplitude is less than the threshold value, a bit is determined as 0. In another method, frequency modulation is used. As shown in FIG. 2, a frequency-modulated signal of a coordinate position is combined with a stylus tip pressure signal or a function key pressing signal to form an encoded signal. Information of the encoded signal is frequency modulated, where each frequency represents certain information. The certain information is modulated by using a corresponding frequency. Frequency demodulation is performed by a screen side to obtain the information.

However, during the implementation of the present disclosure, the inventor(s) finds that the existing techniques at least have the following issues: A main disadvantage of the binary coding method is that each coding bit only has two states 0 and 1, which contains a relatively small amount of information. To transmit more information, it is necessary to increase the amount of coding bits. In this case, information encoding takes a long time, and a refresh rate may be reduced. In the method of frequency modulation, to transmit more information, a bandwidth of a frequency-modulated signal may be increased, so that a larger bandwidth is available for information encoding. Alternatively, a frequency may be modulated in a more refined manner so that frequency resolution can be increased to obtain more information while a bandwidth remains unchanged. In such a case, there are higher requirements on the hardware performance for frequency modulation and demodulation. Moreover, demodulation resolution is directly proportional to the time duration of a signal. A demodulator requires a longer signal time duration to obtain better frequency resolution.

Therefore, it becomes more important to improve the efficiency of information transmission between an active stylus and a screen side.

SUMMARY

An objective of the present disclosure is to provide a method for generating signals, a method for analyzing signals, an active stylus, and a touch screen, so as to transmit more coding information within a relatively short time without increasing hardware load, thereby improving the efficiency of information transmission between an active stylus and a touch screen.

To solve the above technical problem, some embodiments of the present disclosure provide a method for generating a signal that is applied to an active stylus. The method includes encoding, by the active stylus, information into n-bit q-ary codes; performing, by the active stylus, frequency modulation on the n-bit q-ary codes respectively to generate a plurality of encoded frequency-modulated signals; and combining, by the active stylus, a preset fixed-frequency signal for detecting a stylus tip position with the plurality of encoded frequency-modulated signals to form an encoded signal.

Some embodiments of the present disclosure further provide a method for analyzing a signal that is applied to a touch screen. The method includes recognizing, by the touch screen, a plurality of encoded frequency-modulated signals and a fixed-frequency signal for detecting a stylus tip position from a received encoded signal, where the encoded signal is generated according to a signal generation method performed by an active stylus; performing, by the touch screen, frequency demodulation on the plurality of encoded frequency-modulated signals to obtain n-bit q-ary codes that corresponds to the plurality of encoded frequency-modulated signals respectively; obtaining, by the touch screen, information corresponding to the n-bit q-ary codes according to a preset corresponding relationship between the n-bit q-ary codes and the information; performing, by the touch screen, amplitude demodulation on the fixed-frequency signal for detecting a stylus tip position to obtain a demodulation amplitude of the fixed-frequency signal for detecting a stylus tip position; and calculating, by the touch screen, a stylus tip position of the active stylus according to the demodulation amplitude.

Some embodiments of the present disclosure further provide an active stylus including: an information encoding module configured to encode information into n-bit q-ary codes; a frequency modulation module connected to the information encoding module, and the frequency modulation module being configured to perform frequency modulation on the n-bit q-ary codes respectively to generate a plurality of encoded frequency-modulated signals; and a signal combination module connected to the frequency modulation module, and the signal combination module being configured to combine a preset fixed-frequency signal for detecting a stylus tip position with the plurality of encoded frequency-modulated signals to form an encoded signal.

Some embodiments of the present disclosure further provide a touch screen including: a signal receiving module configured to receive an encoded signal transmitted by an active stylus according to the above method for generating signals; a signal recognition module connected to the signal receiving module, and the signal recognition module being configured to recognize, from the encoded signal, a plurality of encoded frequency-modulated signals and a fixed-frequency signal for detecting a stylus tip position; a frequency demodulation module connected to the signal recognition module, and the frequency demodulation module being configured to perform frequency demodulation on the plurality of encoded frequency-modulated signals to obtain n-bit q-ary codes that correspond to the plurality of encoded frequency-modulated signals respectively; an information obtaining module connected to the frequency demodulation module, and the information obtaining module being configured to obtain information corresponding to the n-bit q-ary codes according to a preset relationship between the n-bit q-ary codes and the information; an amplitude demodulation module connected to the signal recognition module, and the amplitude demodulation module being configured to perform amplitude demodulation on the fixed-frequency signal for detecting a stylus tip position, to obtain a demodulation amplitude of the fixed-frequency signal for detecting a stylus tip position; and a position calculation module connected to the amplitude demodulation module, and the position calculation module being configured to calculate a stylus tip position of the active stylus according to the demodulation amplitude.

As compared with existing techniques, in some embodiments of the present disclosure, an active stylus encodes transmission information into n-bit q-ary codes and performs frequency modulation on each bit, and generates a plurality of encoded frequency-modulated signals. That is, the plurality of encoded frequency-modulated signals are used to represent transmission information in an encoded signal, so as to transmit more coding information within a relatively short time, thereby improving the efficiency of information transmission between the active stylus and a touch screen.

In addition, the transmission information includes a stylus tip pressure of the active stylus or a function key press signal of the active stylus. A stylus tip of the active stylus transfers the transmission information to a touchscreen, to enable the touchscreen to obtain specific operation information after demodulation.

In addition, the n-bit q-ary codes may be an n-bit octal code, so as to provide a relatively used q-ary code.

In addition, in the encoded signal, the plurality of encoded frequency-modulated signals is sequentially and consecutively arranged. With this sequential and consecutive arrangement manner, after receiving the encoded signal, the touchscreen can decode a plurality of received codes more conveniently to obtain transmission information corresponding to the plurality of codes.

DETAILED DESCRIPTION

To make the objectives, technical solutions, and advantages of the present disclosure clearer, various embodiments of the present disclosure are described below in detail with reference to the accompanying drawings. However, a person of ordinary skill in the art may understand that in the embodiments of the present disclosure, many technical details are provided for a reader to better understand the present application. However, the technical solutions to be protected in the present application may be implemented even without these technical details and various changes and modifications that can be made based on the following embodiments.

Figure 1:
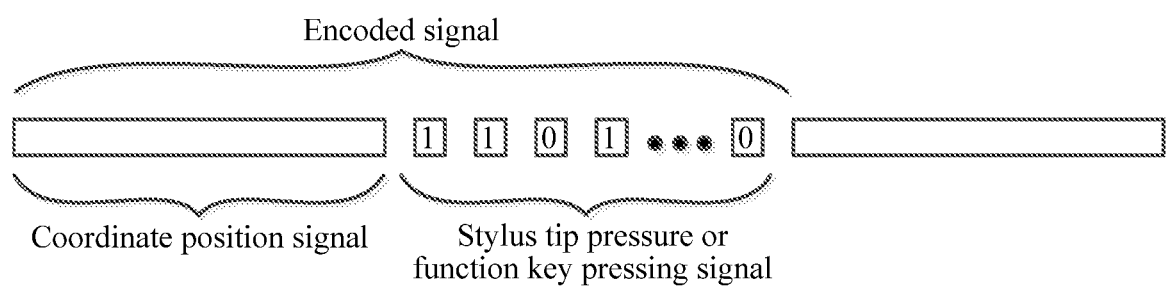
FIG. 1 is a schematic diagram of an encoded signal generated by an existing active stylus by using amplitude-modulation binary encoding.
Figure 2:
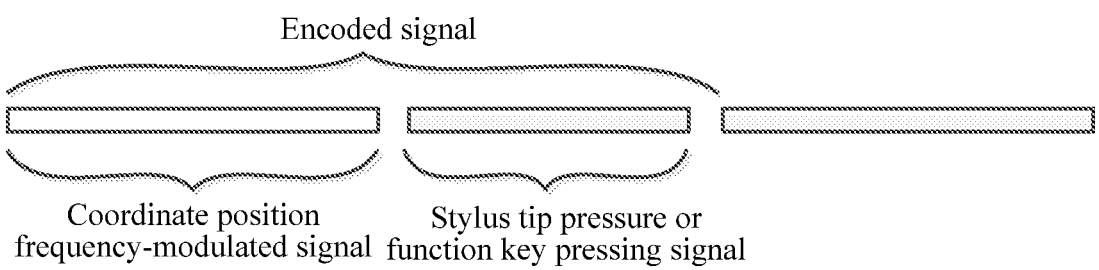
FIG. 2 is a schematic diagram of an encoded signal generated by an existing active stylus by using frequency modulation.
Figure 3:
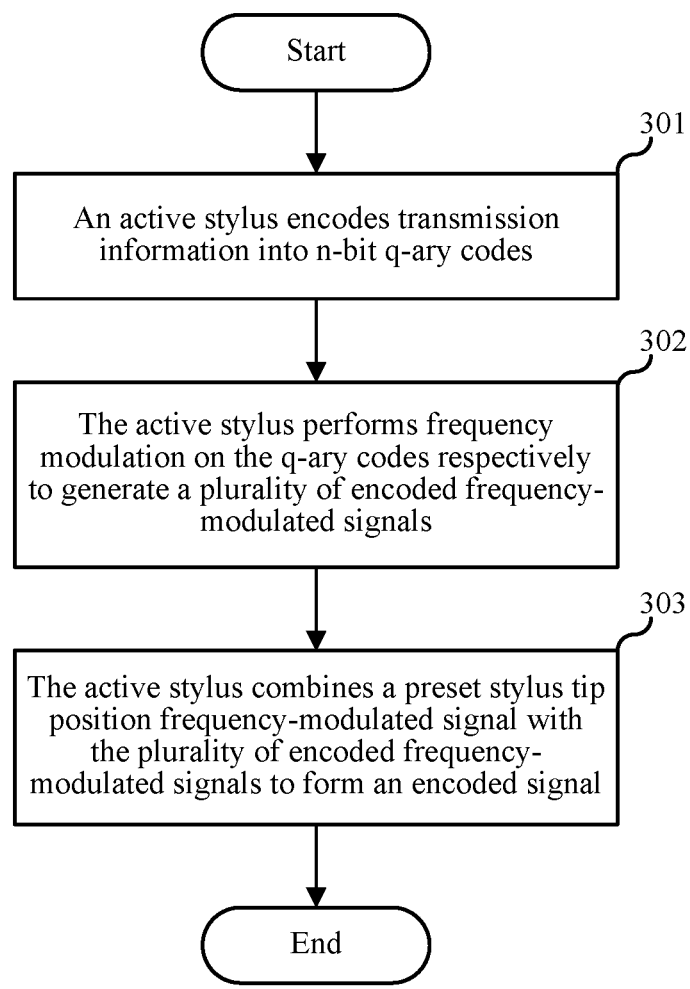
FIG. 3 is a flowchart of a method for generating a signal according to a first embodiment.

A first embodiment of the present disclosure relates to a method for generating a signal, mainly applied to an active stylus. FIG. 3 is a flowchart of the method for generating a signal according to the first embodiment.

First, in step 301, the active stylus encodes information into n-bit q-ary codes.

Specifically, the information is obtained through detection by the active stylus. If information is detected, the active stylus starts to perform this operation. If no information is detected, the active stylus needs to continue to detect information.

For example, when a stylus tip of the active stylus has an operation on a touchscreen of a terminal device, information V detected by the active stylus is a stylus tip pressure. Then the detected stylus tip pressure is encoded into n-bit q-ary codes. In this embodiment, a q-ary code is, for example, an octal code, and an n-bit q-ary code is, for example, a five-bit octal code. That is, after the detected information V is encoded into five-bit octal codes, the encoded information V corresponds to five-bit (A, B, C, D, and E) octal codes.

It should be noted that, in this embodiment, the quantity n of bits and the base q in the n-bit q-ary codes are not limited. A specific type of the information in this embodiment is not limited. The information may further be, in addition to the stylus tip pressure of the active stylus, other information such as a function key pressing signal of the active stylus.

Next, in step 302, the active stylus performs frequency modulation on the q-ary codes, to separately generate a plurality of encoded frequency-modulated signals.

For example, for the five-bit (A, B, C, D, and E) octal codes obtained in the above example of step 301, according to a manner of frequency modulation, frequency modulation is performed on the five-bit (A, B, C, D, and E) octal codes, to obtain encoded frequency-modulated signals A1, B1, C1, D1, and E1 that correspond to the five-bit (A, B, C, D, and E) octal codes.

Next, in step 303, the active stylus combines a preset fixed-frequency signal for detecting a stylus tip position with the plurality of encoded frequency-modulated signals to form an encoded signal.

The fixed-frequency signal for detecting a stylus tip position may be generated by the active stylus through modulation according to a preset modulation frequency. For example, the preset fixed frequency is F, and the active stylus generates, according to the fixed frequency, a signal X for detecting a stylus tip position.

Figure 4:
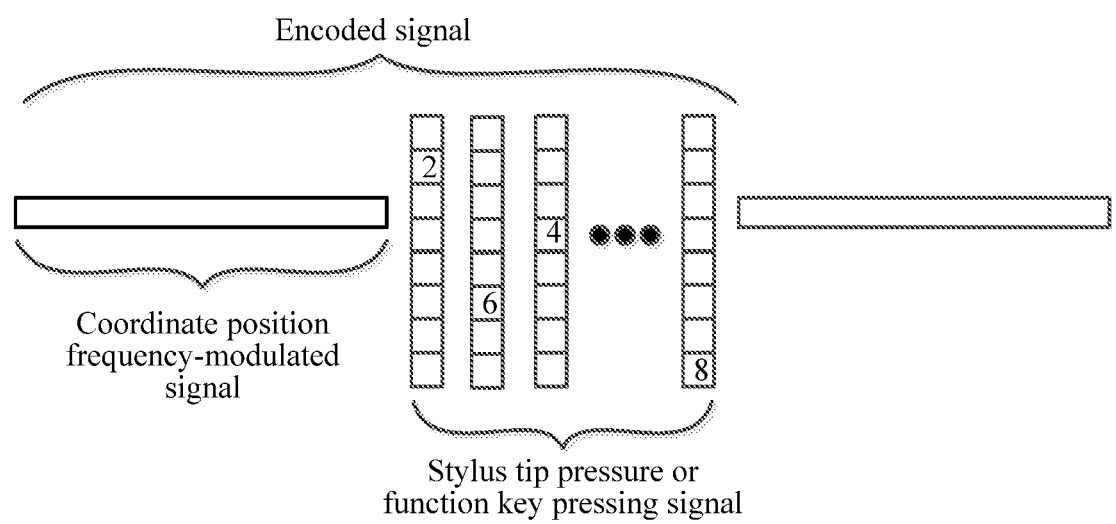
FIG. 4 is a schematic diagram of an encoded signal generated by using a method for generating a signal according to a first embodiment.

The active stylus sequentially arranges the fixed-frequency signal for detecting a stylus tip position and the plurality of encoded frequency-modulated signals according to an order, so as to combine the signals to form the encoded signal. For example, in a manner of frequency modulation and octal coding shown in FIG. 4, the fixed-frequency signal for detecting a stylus tip position is combined with a frequency-modulated signal that is obtained by frequency modulation and n-bit octal coding on the detected stylus tip pressure signal or the pressing signal of a function key, to form an encoded signal in one frame. That is, the front part of the encoded signal is a coordinate position frequency-modulated signal, and the rear part of the encoded signal is the plurality of encoded frequency-modulated signals of the information. However, in an actual application, the fixed-frequency signal for detecting a stylus tip position may be inserted in the middle of a plurality of encoded frequency-modulated signals, and the signals are combined to form the encoded signal in one frame. That is, in the encoded signal, the fixed-frequency signal for detecting a stylus tip position and the plurality of encoded frequency-modulated signals of the information are alternately arranged, as long as a receiving end performs synchronous demodulation according to a corresponding arrangement rule.

In an actual application, the active stylus generates the encoded signal according to a preset encoding frequency, and sends the encoded signal. That is, the active stylus periodically transmits the encoded signal. The encoding frequency may be understood as a refresh frequency of the information.

For an existing frequency modulation via a single frequency, with a certain hardware capability, the resolution of frequency demodulation is directly proportional to the time duration of a signal. Frequency modulation is performed in a frequency band with a fixed bandwidth F. If the time duration of the signal is t, the frequency resolution is $\Delta f$. In this case, an amount of information that can be transmitted in the frequency band is $F/\Delta f$. By contrast, in this embodiment, a modulation with n-bit q-ary coding scheme is used. If the signal is divided into two t/2 signals for encoding, an amount of information of a code on each bit is $F/(2*\Delta f)$. In this case, an amount of information that can be transmitted by using the codes on two bits is $(F*F)/(4*\Delta f*\Delta f)$. Therefore, more information can be transmitted within a same time and by using a same frequency modulation and demodulation capability.

In this embodiment, information is encoded into the n-bit q-ary codes, and an amount of information that can be transmitted by using the same quantity of bits is greatly increased. Moreover, because frequency modulation is performed on each bit of the q-ary codes, coding at each bit that is obtained through demodulation at different positions on a screen has a consistent value, thereby ensuring the accuracy of information transmission.

Figure 5:
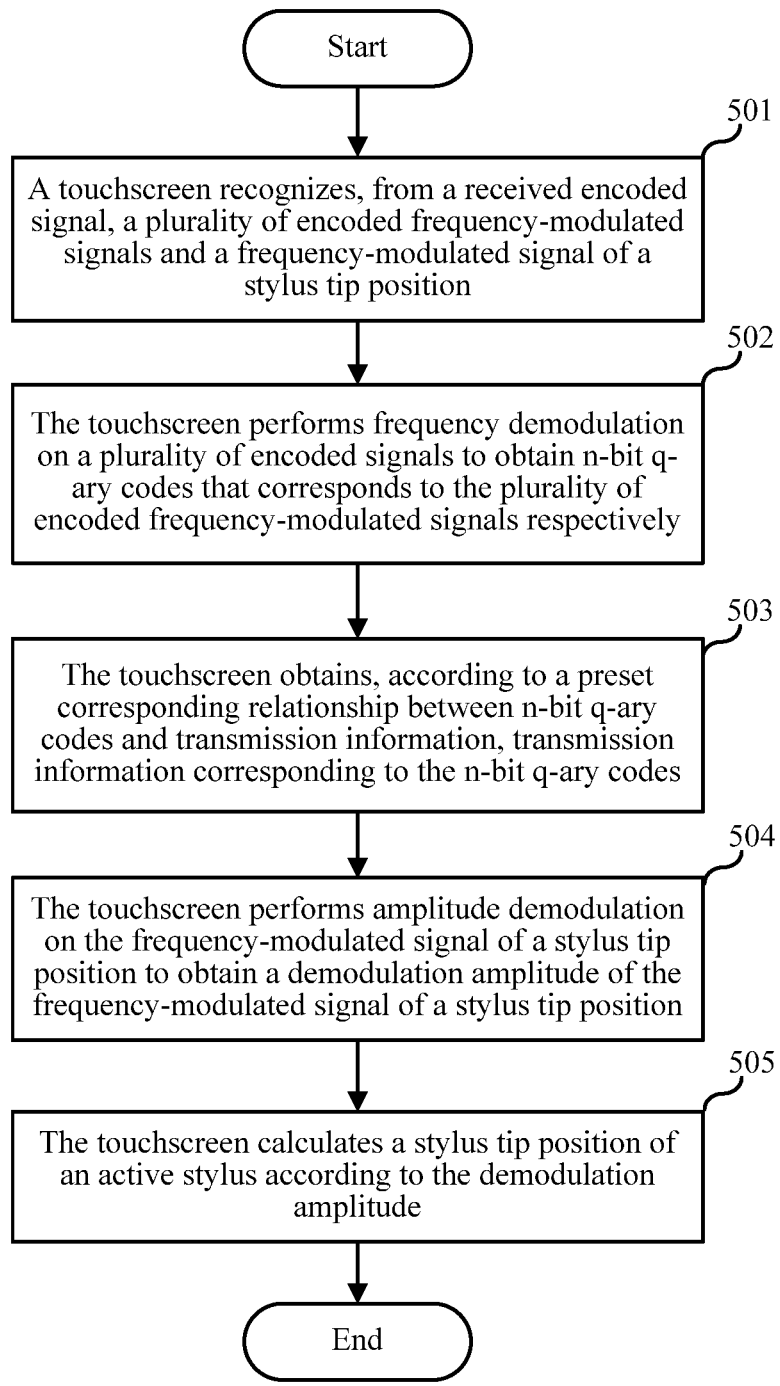
FIG. 5 is a flowchart of a method for analyzing a signal according to a second embodiment.

A second embodiment of the present disclosure relates to a method for analyzing a signal that is mainly applied to a touchscreen in an electronic device. The electronic device is, for example, a mobile phone or a tablet computer, as shown in FIG. 5.

First, in step 501, the touchscreen recognizes, from a received encoded signal, a plurality of encoded frequency-modulated signals and a fixed-frequency signal for detecting a stylus tip position.

Specifically, the touchscreen first needs to detect whether there is an encoded signal transmitted by a stylus tip of an active stylus. If an encoded signal transmitted by the stylus tip of the active stylus is detected, the touchscreen starts to perform this operation. If an encoded signal transmitted by the stylus tip of the active stylus is not detected, the touchscreen continues to detect whether there is an encoded signal transmitted by the stylus tip of the active stylus.

For example, when the touchscreen detects the encoded signal transmitted by the active stylus, the touchscreen starts to receive the encoded signal. In a process of synchronously receiving the encoded signal, five frequency-modulated signals A1, B1, C1, D1, and E1 and a fixed-frequency signal X for detecting a stylus tip position are recognized from the encoded signal.

Next, in step 502, the touchscreen performs frequency demodulation on the plurality of encoded signals to obtain n-bit q-ary codes that corresponds to the plurality of encoded frequency-modulated signals respectively.

For example, for the five frequency-modulated signals A1, B1, C1, D1, and E1 obtained in the above case, the touchscreen performs frequency demodulation on the five frequency-modulated signals to obtain five-bit (A, B, C, D, and E) octal codes that correspond to the five frequency-modulated signals respectively.

Next, in step 503, the touchscreen obtains information corresponding to the n-bit q-ary codes according to a preset corresponding relationship between n-bit q-ary codes and information.

The touchscreen prestores the preset corresponding relationship between the n-bit q-ary codes and the information. For example, according to the preset corresponding relationship between the n-bit q-ary codes and the information, it can be obtained that information corresponding to the five-bit (A, B, C, D, and E) octal code is V. That is, the touchscreen receives the information V from the active stylus.

Next, in step 504, the touchscreen performs amplitude demodulation on the fixed-frequency signal for detecting a stylus tip position, to obtain a demodulation amplitude of the fixed-frequency signal for detecting a stylus tip position.

For example, for the fixed-frequency signal X for detecting a stylus tip position, the touchscreen performs, according to a manner of amplitude demodulation, demodulation on the fixed-frequency signal X for detecting a stylus tip position, to obtain a demodulation amplitude F of the fixed-frequency signal X for detecting a stylus tip position.

Next, in step 505, the touchscreen calculates a stylus tip position of the active stylus according to the demodulation amplitude.

Specifically, ITO channels are separately arranged on the touchscreen in a horizontal direction and a vertical direction, to form a grid form. The ITO channels are equivalent to signal receiving cables. When the active stylus is placed at a position on the touchscreen, a signal transmitted by the active stylus is received by multiple ITO channels at the position. A signal received by an ITO channel closer to the signal transmission point at the stylus tip of the active stylus is stronger, and a signal received by an ITO channel farther away from the signal transmission point is weaker. Amplitudes of signals received on the ITO channels are demodulated, and a position with the highest signal amplitude in the horizontal or vertical direction is precisely calculated through interpolation. In this way, precise positions of the stylus tip in the horizontal and vertical directions may be calculated.

In this embodiment, more information can be transmitted with a same frequency modulation and demodulation capability, thereby effectively improving the efficiency of information transmission between an active stylus and a touch screen.

The division of steps in the foregoing methods is merely for clear description. During implementation, the steps may be combined into one step or some steps may be divided into a plurality of steps, which falls within the protection scope of this patent provided that a same logic relationship is included. Addition of noncritical modifications or introduction of noncritical designs to algorithms or procedures that does not change the core design of the algorithms and procedures falls within the protection scope of the patent.

Figure 6:
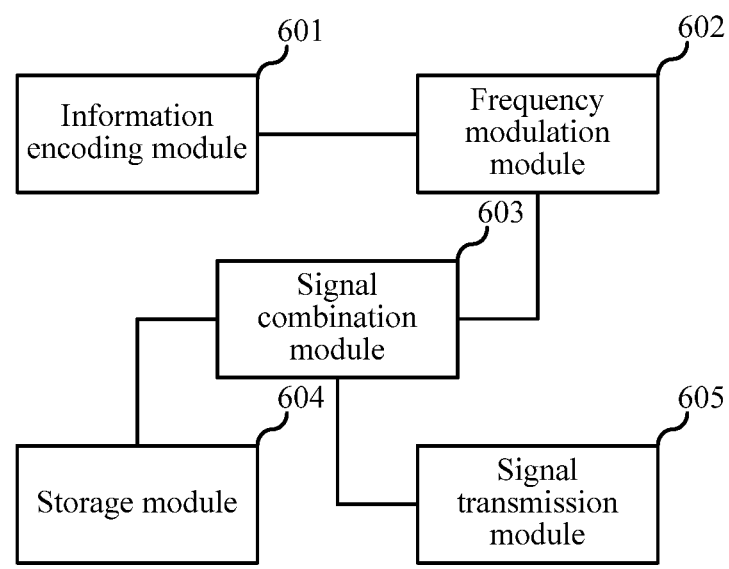
FIG. 6 is a schematic block diagram of an active stylus according to a third embodiment.

A third embodiment of the present disclosure relates to an active stylus. A specific structure of the active stylus is shown in FIG. 6.

The active stylus includes: an information encoding module 601, a frequency modulation module 602, a signal combination module 603, and a storage module 604.

It should be noted that the active stylus in this embodiment is mainly used in conjunction with a smart terminal including a touchscreen. The smart terminal is, for example, a mobile phone or a tablet computer.

The information encoding module 601 is configured to encode transmission information by using an n-bit q-ary code.

The frequency modulation module 602 is connected to the information encoding module 601. The frequency modulation module 602 is configured to perform frequency modulation on the n-bit q-ary code obtained after encoding by the information encoding module 601, to separately generate a plurality of encoded frequency-modulated signals.

The signal combination module 603 is connected to the frequency modulation module 602. The signal combination module 603 is configured to combine a preset fixed-frequency signal for detecting a stylus tip position with the plurality of encoded frequency-modulated signals that is generated by the frequency modulation module 602 to form an encoded signal.

The storage module 604 is connected to the signal integration module 603, and is configured to store the fixed-frequency signal for detecting a stylus tip position.

In practice, the active stylus further includes a signal transmission module 605 connected to the signal combination module 603. The signal transmission module 605 is configured to transmit the encoded signal that is formed through combination by the signal combination module 603.

It is not difficult to see that this embodiment is a system example that corresponds to the first embodiment. This embodiment may be implemented in conjunction with the first embodiment. The related technical details mentioned in the first embodiment are still effective in this embodiment. To reduce repetition, details are no longer described herein. Correspondingly, related technical details mentioned in this embodiment may also be applied to the first embodiment.

By means of the active stylus in this embodiment, an existing problem of low efficiency of information transmission between the active stylus and a touch screen is solved, so that more code information can be transmitted within a relatively short time and the accuracy of information transmission is also improved.

It should be noted that the modules in this embodiment are all logic modules. In an actual application, one logic unit may be one physical unit, or may be a part of a physical unit, or may further be implemented by using a combination of multiple physical units. In addition, to highlight the innovative parts of the present disclosure, units that are not closely related to the solving of the technical problems discussed in the present disclosure are not introduced in this embodiment. However, this does not indicate that other units do not exist in this embodiment.

Figure 7:
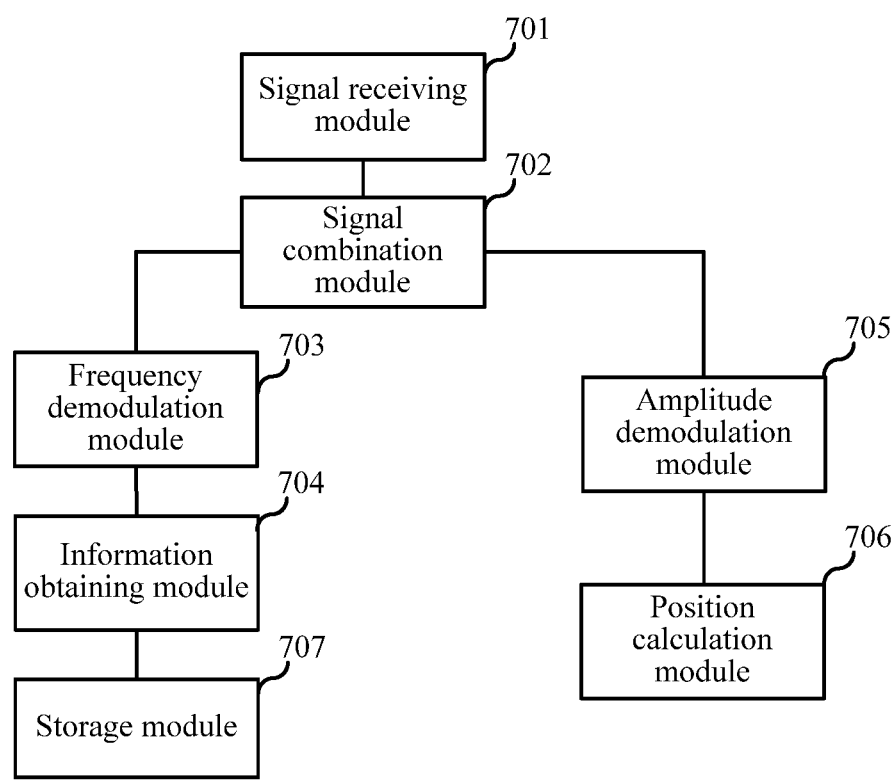
FIG. 7 is a schematic block diagram of a touchscreen according to a fourth embodiment.

A fourth embodiment of the present disclosure relates to a touch screen. The touch screen in this embodiment is mainly applicable to a smart terminal including a touchscreen. The smart terminal is, for example, a mobile phone or a tablet computer. A specific structure of the touch screen is shown in FIG. 7. The touch screen includes: a signal receiving module 701, a signal recognition module 702, an information obtaining module 703, a frequency demodulation module 704, an amplitude demodulation module 705, a position calculation module 706, and a storage module 707.

The signal receiving module 701 is configured to receive an encoded signal transmitted by an active stylus by using a signal transmission method.

The signal recognition module 702 is connected to the signal receiving module 701. The signal recognition module 702 is configured to recognize a plurality of encoded frequency-modulated signals from the encoded signal transmitted by the active stylus.

The frequency demodulation module 703 is connected to the signal recognition module 702. The frequency demodulation module 703 is configured to perform frequency demodulation on the plurality of encoded frequency-modulated signals to obtain n-bit q-ary codes that corresponds to the plurality of encoded frequency-modulated signals respectively.

The information obtaining module 704 is connected to the frequency demodulation module 703. The information obtaining module 704 is configured to obtain, information that corresponds to n-bit q-ary codes according to a preset relationship between the n-bit q-ary codes and information.

The amplitude demodulation module 705 is connected to the signal recognition module 701. The amplitude demodulation module 705 is configured to perform amplitude demodulation on a fixed-frequency signal for detecting a stylus tip position, to obtain a demodulation amplitude of the fixed-frequency signal for detecting a stylus tip position.

The position calculation module 706 is connected to the amplitude demodulation module 705. The position calculation module 706 is configured to calculate a stylus tip position of the active stylus according to the demodulation amplitude.

The storage module 707 is connected to the information obtaining module 704. The screen end storage module 707 is configured to store the preset relationship between n-bit q-ary codes and information.

It should be noted that, the information may be a stylus tip pressure signal of the active stylus or a function key pressing signal of the active stylus.

Because the second embodiment and this embodiment correspond to each other, this embodiment may be implemented in conjunction with the second embodiment. The related technical details discussed in the second embodiment are still effective in this embodiment. The technical effects that can be achieved in the second embodiment can also be achieved in this embodiment. To reduce repetition, details are no longer described herein. Correspondingly, the related technical details in this embodiment are also applicable to the second embodiment.

By means of the touchscreen in this embodiment, refresh rates at a screen side of a mobile phone and of a tablet computer are significantly improved.

A person skilled in the art can understand that, all or some of the steps in the methods in the above embodiments may be implemented by a program instructing relevant hardware. The program is stored in a storage medium, and includes several instructions for enabling a device (which may be a single-chip microcomputer, a chip, or the like) or a processor to perform all or some of the steps in the methods in the foregoing embodiments. The above storage medium includes various media which can store a program code, such as a USB flash drive, a removable hard disk, a read-only memory (ROM), a random access memory (RAM), a magnetic disk, or an optical disc.

A person of ordinary skill in the art can understand that the above embodiments are specific examples for implementing the present disclosure. However, in an actual application, various changes may be made to these examples in terms of forms and details without departing from the spirit and scope of the present disclosure.

What is claimed is:

1. A method for generating a signal with an active stylus, comprising:
    encoding, by the active stylus, information into n-bit q-ary codes; wherein q is an integer greater than 2;
    performing, by the active stylus, frequency modulation on the n-bit q-ary codes respectively to generate a plurality of encoded frequency-modulated signals; and
    combining, by the active stylus, a fixed-frequency signal for detecting a stylus tip position with the plurality of encoded frequency-modulated signals to form an encoded signal.

2. The method of claim 1, wherein the information comprises: a stylus tip pressure signal of the active stylus and/or a function key pressing signal of the active stylus.

3. The method according to claim 1, wherein the n-bit q-ary codes comprise an n-bit octal code.

4. The method according to claim 1, wherein, in the encoded signal, the plurality of encoded frequency-modulated signals is sequentially and consecutively arranged.

5. The method according to claim 1, wherein the fixed-frequency signal for detecting a stylus tip position of the active stylus is generated by the active stylus according to a preset frequency.

6. An active stylus for generating a signal according to claim 1, the active stylus comprising:
    an information encoding module configured to encode information into n-bit q-ary codes;
    a frequency modulation module connected to the information encoding module, the frequency modulation module being configured to perform frequency modulation on the n-bit q-ary codes to generate a plurality of encoded frequency-modulated signals, respectively; and
    a signal combination module connected to the frequency modulation module, the signal combination module being configured to combine a preset fixed-frequency signal for detecting a stylus tip position with the plurality of encoded frequency-modulated signals to form an encoded signal.

7. The active stylus according to claim 6, wherein the active stylus further comprises:
    a storage module, the storage module being connected to the signal combination module, the storage module being configured to store the fixed-frequency signal for detecting a stylus tip position.

8. A touch screen for analyzing a signal, the touch screen comprising:
    a signal receiving module configured to receive an encoded signal transmitted by the active stylus by using a method according to claim 1;
    a signal recognition module connected to the signal receiving module, the signal recognition module being configured to recognize, from the encoded signal, a plurality of encoded frequency-modulated signals and a fixed-frequency signal for detecting a stylus tip position;
    a frequency demodulation module connected to the signal recognition module, the frequency demodulation module being configured to perform frequency demodulation on the plurality of encoded frequency-modulated signals to obtain n-bit q-ary codes that correspond to the plurality of encoded frequency-modulated signals, respectively;
    an information obtaining module connected to the frequency demodulation module, the information obtaining module being configured to obtain information corresponding to the n-bit q-ary codes according to a preset relationship between the n-bit q-ary codes and the information;
    an amplitude demodulation module connected to the signal recognition module, the amplitude demodulation module being configured to perform amplitude demodulation on the fixed-frequency signal for detecting a stylus tip position to obtain a demodulation amplitude of the fixed-frequency signal for detecting a stylus tip position; and
    a position calculation module connected to the amplitude demodulation module, the position calculation module being configured to calculate a stylus tip position of the active stylus according to the demodulation amplitude.

9. The touchscreen according to claim 8, wherein the touchscreen further comprises:
    a storage module connected to the information obtaining module, the storage module being configured to store the preset relationship between the n-bit q-ary codes and the information.

10. A method for analyzing a signal with a touch screen, comprising:
    recognizing, by the touch screen, a plurality of encoded frequency-modulated signals and a fixed-frequency signal for detecting a stylus tip position from a received encoded signal, wherein the encoded signal is generated by the active stylus by using a method for generating a signal; performing, by the touch screen, frequency demodulation on the plurality of encoded frequency-modulated signals to obtain n-bit q-ary codes that correspond to the plurality of encoded frequency-modulated signals, respectively; wherein q is an integer greater than 2;
    obtaining, by the touch screen, information that corresponds to the n-bit q-ary codes according to a preset correspondence between n-bit q-ary codes and the information;
    performing, by the touch screen, amplitude demodulation on the fixed-frequency signal for detecting a stylus tip position to obtain a demodulation amplitude of the fixed-frequency signal for detecting a stylus tip position; and calculating, by the touch screen, a stylus tip position of the active stylus according to the demodulation amplitude;

wherein the method for generating a signal comprises:

encoding, by the active stylus, information into n-bit q-ary codes;

performing, by the active stylus, frequency modulation on the n-bit q-ary codes, respectively, to generate a plurality of encoded frequency-modulated signals; and combining, by the active stylus, a fixed-frequency signal for detecting a stylus tip position with the plurality of encoded frequency-modulated signals to form an encoded signal.

11. The method of claim 10, wherein the information comprises: a stylus tip pressure signal of the active stylus and/or a function key pressing signal of the active stylus.

12. The method according to claim 10, wherein the n-bit q-ary codes comprises an n-bit octal code.

13. The method according to claim 10, wherein, in the encoded signal, the plurality of encoded frequency-modulated signals is sequentially and consecutively arranged.

14. The method according to claim 10, wherein the fixed-frequency signal for detecting a stylus tip position of the active stylus is generated by the active stylus according to a preset frequency.

* * * * *